Sept. 22, 1959    R. J. GORSKY    2,905,016
TRANSMISSION CONTROL
Filed March 12, 1956
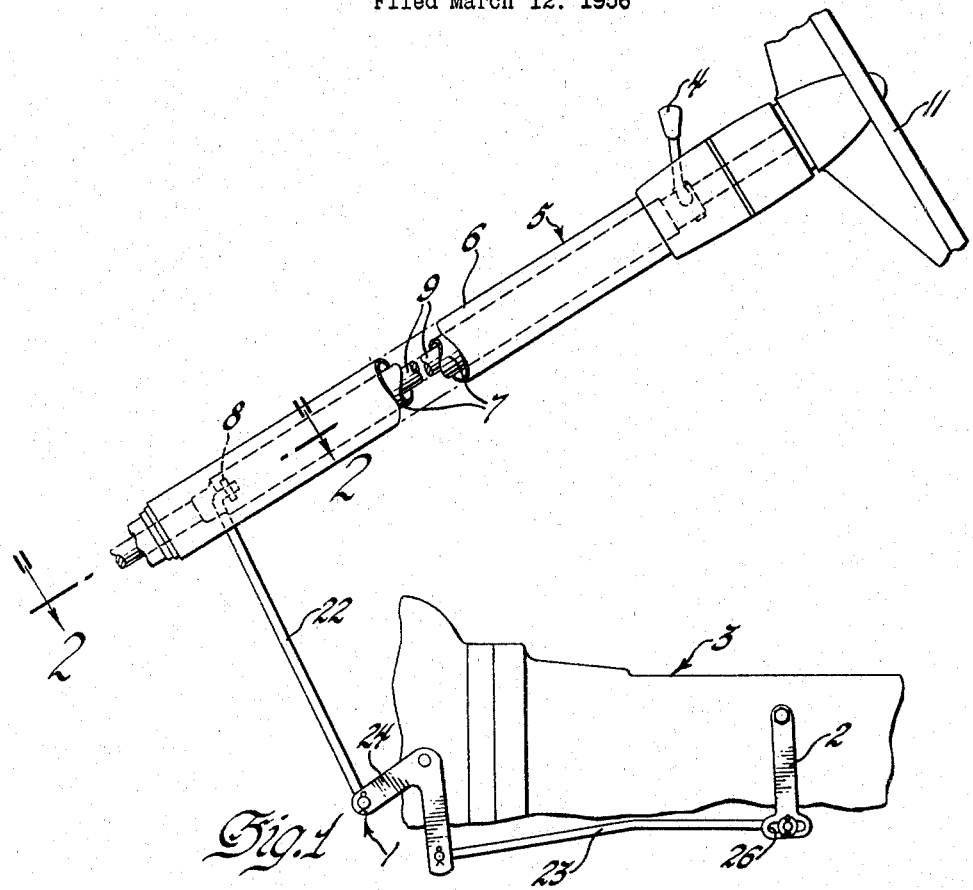
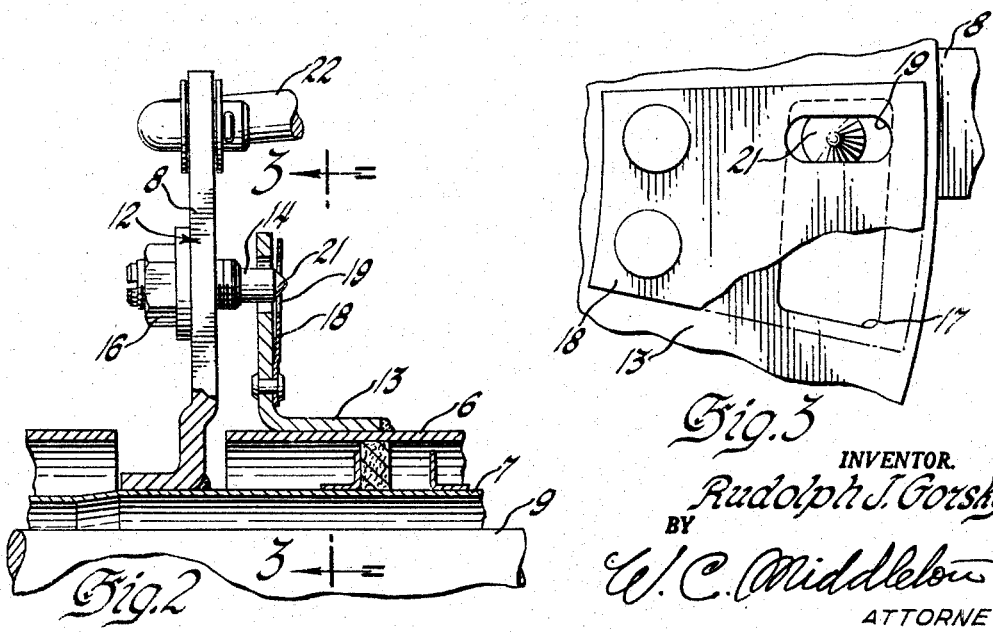
INVENTOR.
Rudolph J. Gorsky
BY
W. C. Middleton
ATTORNEY

United States Patent Office

2,905,016
Patented Sept. 22, 1959

2,905,016

TRANSMISSION CONTROL

Rudolph J. Gorsky, Fenton, Mich., assignor to General Motors Corporation, Detroit, Mich., a corporation of Delaware Application March 12, 1956, Serial No. 570,936

6 Claims. (Cl. 74—475)

This invention relates to an improved transmission linkage control.

Because in many motor vehicles it is necessary to install the transmission selector lever a substantial distance from the transmission, usually either of the automatic or synchromesh type, interconnecting control linkage must be employed. In this type arrangement many problems arise, with vibration and installation being among the foremost. The solutions to these problems have been many and varied. Since most of them have been complex and impractical, the need of a simple and practical solution still exists.

Vibration, apparently inherent because of the remoteness of the controlled members, not only creates objectionable rattles but also may, if severe, interfere with the efficient operation; for example, the selector lever by road shocks may be jarred to a different position resulting in an undesired change in the transmission speed ratio. The present invention contemplates eliminating communication of engine and transmission motion to the control linkage by a novel and simplified interrelationship of the associated levers and links.

As for the installation, it is obvious that the relationship between the position of the manual selector lever and the corresponding position or condition of the transmission must be accurate. Otherwise, with the selector lever in the desired position, for example reverse, the transmission, because of misalignment of the control linkage, may not be completely in the proper position to effect reverse. Consequently, the transmission may be rendered inoperative or only partially operative. To overcome this difficulty the present invention provides a unique means for making a proper adjustment at any time. Since this means is an integral part of the control linkage, adjustment can be made not only with the first assembly line installation but also later when repairs are required. Previously, the assembly line adjustment was made accurately but any subsequent corrections were generally made by trial and error.

The foregoing and other objects and advantages of the invention will be apparent from the following description and from the accompanying drawings in which:

Figure 1 is a side elevational view of the steering column and the transmission with the interconnecting control linkage.

Figure 2 is an enlarged partial section along the line 2—2 of Figure 1, and

Figure 3 is an enlarged view of the spring for the detent assembly looking in the direction of arrows 3—3 of Figure 2.

One embodiment of the invention is illustrated in Figure 1, in which a control linkage 1 transfers motion between a transmission shift lever 2, mounted on a transmission 3 and a selector lever 4, supported by a conventional steering column 5. The transmission may be of any type requiring manual manipulation, such as an automatic or a synchromesh transmission. Within a mast jacket 6 a control tube or shaft 7 is rotatably mounted having the selector lever 4 affixed at one end and a control lever or arm 8 attached to the other end. A steering shaft 9 with a steering wheel 11 suitably fastened is rotatably mounted inside the control tube 7.

In Fig. 2 a detent assembly 12 is shown comprising a detent plate 13 connected to the mast jacket 6 and a detent pin or cam 14 connected to the control arm 8 by a bolt 16. The detent plate 13 includes an elongated slot or guide 17 for receiving the detent pin 14 and an attached, as by rivets, flexible plate or leaf spring 18 having an elongated slot 19 suitable for reception of a conical end portion 21 of the detent pin 14. Whenever the detent pin 14 is engaged with this slot 19, the control arm 8 and, accordingly, the shifter tube 7 and selector lever 4 will all be resiliently held, requiring an additional force to be exerted on the selector lever 4 before the pin 14 will disengage from the slot 19.

Because the detent plate 13 is fixed to the stationary mast jacket 6, a reference position of the selector lever 4 is established whenever the detent pin 14 engages the elongated slot 19 in the leaf spring 18. Therefore, the relative positions of the detent plate 13 and the control lever 8 are important in making an adjustment of the linkage 1. Assuming that an automatic transmission is being controlled by this mechanism, this reference point is established preferably with the selector lever 4 in the drive range position, thus accurately positioning the control lever 8. It should be noted that the pin 14, when engaged with the slot 19, does not touch the sides of the slot 17. Since the lever 4 will be more frequently in the drive range position, this will prevent the metallic surfaces from rubbing and causing undesired noises.

For interconnecting the control arm 8 and the transmission shift lever 2 the control linkage 1 is provided comprising an upper link 22 affixed to the control arm 8, a lower link 23 attached through a lost motion connection to the shift lever 2 and a bell crank 24 pivotally mounted to the transmission 3 for interconnecting the upper and lower links 22 and 23. This lost motion connection between the lower link 23 and the shift lever 2 is employed for preventing the communication of engine and transmission motion to the linkage, and thence to the manual control lever. Since the engine and transmission are mounted in the vehicle on resilient supports they are capable of limited movement relative to the frame, due to road roughness and the like, and the present arrangement isolates such movements from the linkage and attached parts. Preferably, an end of the lower link 23 is retained in an elongated slot 26 (see Figure 1), hence permitting limited movement therebetween.

In operation, when the selector lever 4 is rotated to a certain position, motion is transferred by the shifter tube 7 to the control arm 8 through the control linkage 1 to the transmission shift lever 2. At this time, the shift lever 2 should prepare the transmission 3 for providing a speed ratio or a speed range that corresponds to the position of the selector lever 4. To assure this correlation a proper adjustment of the linkage 1 must be made. With the selector lever 4 in the aforementioned drive range position the detent plate 13 and the leaf spring 18 are positioned so that the detent pin 14 will engage the slot 19 (see Figure 3). Then, with the control arm 8 held, the shift lever 2 is moved to the drive range position and held usually by a detent device. This establishes a fixed distance and, accordingly, the correct length required for the control linkage 1. Links of proper lengths are now selected for the correct relationship and installed without concern that the selector lever 4 may have moved slightly. Because the leaf spring 18 will only restrain the control 8 against a predetermined small resistance the leverage of manual selector lever 4 still permits easy movement to any of the other positions, such as reverse.

Furthermore, subsequent adjustment in the linkage 1 can be made conveniently using this same drive range position to obtain the correct alignment of the linkage 1.

I claim:

1. A transmission control mechanism for a transmission having various operating conditions comprising, in combination, a steering column, a control shaft rotatably mounted by said steering column, a selector element affixed to one end of said control shaft for movement therewith to a plurality of positions, a control arm connected to the opposite end of said control shaft, a shift lever adapted to coact with said transmission for varying the operating conditions of the transmission and having an elongated slot therein, a control linkage connected to said control arm and engaging said elongated slot, said elongated slot extending in the direction of movement of said linkage to prevent transfer of vibrations between said linkage and said selector lever, and a detent assembly having a member mounted on said steering column for limiting movement of said control arm and a flexible member fixed relative to said member for resiliently holding said control arm in only one of said plurality of positions to establish a reference position for accurate adjustment of the control mechanism.

2. In a control mechanism for a transmission having various operating conditions, in combination, a movable mounted control shaft, a manually operable selector lever adapted for movement to a plurality of positions and connected to one end of said control shaft, a control arm connected to the opposite end of said control shaft and having a detent pin affixed thereto, a shift lever having an elongated slot and disposed to coact with said transmission for varying the operating conditions of the transmission, a control linkage connecting said control arm and said shift lever, said linkage engaging said elongated slot in said shift lever to provide a lost motion connection between said transmission and said linkage to prevent the transfer of vibrations therebetween, a fixed detent plate including an aperture for receiving said detent pin and limiting movement of said selector lever, and a spring means attached to said detent plate, said spring means having an opening for resiliently engaging said pin when said selector lever is moved to one of said plurality of positions to hold said control linkage stationary for accurate adjustment of the control mechanism.

3. A transmission control mechanism for a transmission having various operating conditions comprising, in combination, a rotatably mounted control shaft, a selector element affixed to one end of said control shaft for movement therewith to a plurality of positions, a control arm connected to the opposite end of said control shaft, a shift lever adapted to coact with said transmission for varying the operating conditions of the transmission, linkage interconnecting said shift lever and said control arm, and a detent assembly having a member fixedly mounted adjacent said control arm for limiting rotatable movement of said control arm by said selector element in either direction and a flexible member fixed relative to said member for resiliently holding said control arm in only one of said plurality of positions to establish a reference position for adjustment of the control mechanism when said linkage is installed between said shift lever and said control arm.

4. In a control mechanism for a transmission having various operating conditions, the combination of a steering column, a movable mounted control shaft rotatably supported by said steering column, a selector element affixed to one end of said control shaft for movement therewith to a plurality of positions, a control arm connected to the opposite end of said control shaft, a shift lever adapted to coact with said transmission for varying the operating conditions of the transmission, a lost motion connection between said shift lever and said control arm for preventing the transfer of vibrations therebetween, and a detent assembly having a member mounted on said steering column for limiting rotatable movement of said control arm by said selector element in either direction and a flexible member fixed relative to said member for resiliently holding said control arm in only one of said plurality of positions to establish a reference position for adjustment of the control mechanism.

5. A transmission control mechanism for a transmission having various operating conditions comprising, in combination, a steering column, a control shaft rotatably mounted by said steering column, a selector element affixed to one end of said control shaft for movement therewith to a plurality of positions, a control arm connected to the opposite end of said control shaft, a shift lever adapted to coast with said transmission for varying the operating conditions of the transmission and having an elongated opening therein, a linkage engaging said elongated opening and interconnecting said shift lever and said control arm, said elongated opening extending in the direction of movement of said linkage to prevent the transfer of vibrations between said shift lever and said control arm, a detent guide plate fixedly mounted on said steering column adjacent said control arm, a pin element connected to said control arm and adapted to engage said guide plate, and resilient means for retaining said pin element in a predetermined position when adjusting said control linkage.

6. A transmission control mechanism for a transmission having various operating conditions comprising, in combination, a steering column, a control shaft rotatably mounted by said steering column, a selector element affixed to one end of said control shaft for movement therewith to a plurality of positions, a control arm connected to the opposite end of said control shaft, a shift lever adapted to coact with said transmission for varying the operating conditions of the transmission, a linkage interconnecting said shift lever and said control arm and adapted to provide a lost motion connection therebetween, and a detent assembly including a camlike member affixed to said control arm, a stationary detent member mounted on said steering column for limiting the extent of movement of the camlike member by the control arm so as to confine the rotary travel of the selector element within predetermined limits, and a flexible member fixed relative to said detent member so as to coact with said camlike member and thereby resiliently hold said control arm in one of said plurality of positions.

References Cited in the file of this patent

UNITED STATES PATENTS

| | | |
|---|---|---|
| 1,087,552 | Rice | Feb. 17, 1914 |
| 1,653,072 | Trunck | Dec. 20, 1927 |
| 2,185,830 | Burt | Jan. 2, 1940 |
| 2,442,159 | Auten | May 25, 1948 |
| 2,558,502 | Williams | June 26, 1951 |
| 2,636,401 | Gubelman | Apr. 28, 1953 |
| 2,716,354 | Dick | Aug. 30, 1955 |

UNITED STATES PATENT OFFICE
CERTIFICATE OF CORRECTION

Patent No. 2,905,016            September 22, 1959

Rudolph J. Gorsky

It is hereby certified that error appears in the printed specification of the above numbered patent requiring correction and that the said Letters Patent should read as corrected below.

Column 2, line 69, for "control 8" read — control arm 8 —; column 4, line 23, for "coast" read — coact —.

Signed and sealed this 19th day of April 1960.

(SEAL)
Attest:

KARL H. AXLINE
Attesting Officer

ROBERT C. WATSON
Commissioner of Patents